W. F. WHITE.
Hand Nail and Bolt-Making Tools.

No. 148,907.            Patented March 24, 1874.

Witnesses:

Inventor:

UNITED STATES PATENT OFFICE.

WILLIAM FRANKLIN WHITE, OF ORANGE, GEORGIA.

IMPROVEMENT IN HAND NAIL AND BOLT MAKING TOOLS.

Specification forming part of Letters Patent No. 148,907, dated March 24, 1874; application filed January 10, 1874.

*To all whom it may concern:*

Be it known that I, WILLIAM F. WHITE, of Orange, in the county of Cherokee and State of Georgia, have invented a new and Improved Hand Nail and Bolt Tool, of which the following is a specification:

My invention consists of a couple of steel bars, having a series of round notches in one side and square ones in the opposite side, of different sizes, said bars being jointed together at one end by a link, which allows the bars to close both their notched sides together, to constitute dies of the notches in which to head nails and bolts. The said bars are held together by handles at the ends opposite the joint, and a dowel-pin on one enters a hole in the other near the handled end, to insure the coinciding of the faces. The notches are countersunk on one side to form tapered heads to the nails and bolts, and flush on the other sides to make flat heads. One series is countersunk upon one side of the bars, and the other upon the other side, so that the bars are not unduly weakened on one side, as they otherwise would be. The said bars are made of steel and duly hardened, to sustain the wear incidental to the hammering up of the heads in them.

Figure 1:
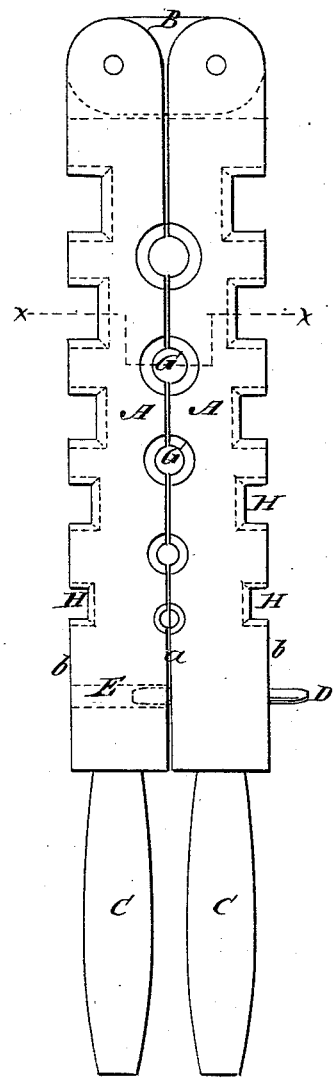
Figure 2:

Figure 1 is a plan view of my improved tool, and Fig. 2 is a cross-section taken on the line *x x* of Fig. 1.

Similar letters of reference indicate corresponding parts.

A represents two rectangular bars of steel, jointed together by a link, B, at one end, so that they can be closed together at either of the two opposite sides *a* or *b*, and at the other end they have handles C, suited to clamp them together by hand. Near said handle is a dowel-pin, D, in one bar, which enters a hole, E, in the other to face the bars properly. The sides *a* of the bars have a series of semicircular notches, G, of different sizes, which coincide when the sides *a* are clamped together, and make round dies for holding round rods for hardening them to make nails and bolts. The other sides *b* have a similar series of square notches, H, which coincide when the said sides *b* are clamped together, and make square holes for holding square rods to head them for nails and bolts. The round holes are countersunk on the upper side of the tool, as represented in Fig. 1, and the square holes on the lower side, and the holes of one kind are arranged between those of the other kind longitudinally of the bars, to economize the strength of the latter as much as possible. The large holes are arranged nearest to the joint, so that the greatest leverage is obtained at the handles to hold them, which is needful, as more power is required for holding the large ones.

This tool will be very useful for blacksmiths and others to make nails, bolts, &c., by hand when they cannot readily be procured ready made.

Having thus described my invention, I claim as new and desire to secure by Letters Patent—

The improved hand nail and bolt making tool herein described, consisting of the pair of handled bars A, jointed together by the link B, and provided with differential half-holes H in the sides, forming dies when the bars are clamped together, substantially as specified.

WILLIAM F. WHITE.

Witnesses:
W. I. CHRISTIAN,
JAMES A. FOWLER.